United States Patent
Dabbiere et al.

(10) Patent No.: US 11,204,993 B2
(45) Date of Patent: *Dec. 21, 2021

(54) LOCATION-BASED CONFIGURATION PROFILE TOGGLING

(71) Applicant: AirWatch, LLC, Atlanta, GA (US)

(72) Inventors: Alan Dabbiere, McLean, VA (US); John Marshall, Atlanta, GA (US); Erich Stuntebeck, Johns Creek, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,816

(22) Filed: May 1, 2019

(65) Prior Publication Data

US 2019/0258798 A1    Aug. 22, 2019

Related U.S. Application Data

(63) Continuation of application No. 15/176,686, filed on Jun. 8, 2016, now Pat. No. 10,303,872, which is a
(Continued)

(51) Int. Cl.
*G06F 21/54* (2013.01)
*H04W 4/029* (2018.01)
(Continued)

(52) U.S. Cl.
CPC .......... *G06F 21/54* (2013.01); *G06F 21/629* (2013.01); *G06Q 10/06314* (2013.01);
(Continued)

(58) Field of Classification Search
CPC .......... G06F 9/455; G06F 21/54; G06F 15/16; G06F 21/44; G06F 9/44; G06F 21/00;
(Continued)

(56) References Cited

U.S. PATENT DOCUMENTS 5,574,786 A    11/1996 Dayan
5,740,395 A     4/1998 Wells
(Continued)

FOREIGN PATENT DOCUMENTS

| CA | 2149337 | 6/1994 |
|---|---|---|
| EP | 2675137 | 12/2013 |
| GB | 2346716 | 8/2000 |
| GB | 2361558 | 10/2001 |

(Continued)

OTHER PUBLICATIONS

European Search Report for PCT/US2014/036668 dated Apr. 11, 2016.
(Continued)

*Primary Examiner* — Thanhnga B Truong
(74) *Attorney, Agent, or Firm* — Clayton, McKay & Bailey, PC

(57) ABSTRACT

Location-based configuration profile toggling may be provided. Configuration profiles associated with user devices may be identified, determinations of whether the user devices are authorized to enable the configuration profiles on the user devices may be made based at least in part on location constraints, and the configuration profiles may be enabled an the user devices if the location constraints are satisfied.

20 Claims, 3 Drawing Sheets

Related U.S. Application Data continuation of application No. 13/875,426, filed on May 2, 2013, now Pat. No. 9,426,162.

(51) Int. Cl.

| | | |
|---|---|---|
| *H04L 12/24* | (2006.01) | |
| *H04W 4/50* | (2018.01) | |
| *H04W 12/08* | (2021.01) | |
| *H04L 29/06* | (2006.01) | |
| *H04W 8/18* | (2009.01) | |
| *H04W 12/37* | (2021.01) | |
| *G06Q 10/06* | (2012.01) | |
| *G06Q 10/10* | (2012.01) | |
| *G06F 21/62* | (2013.01) | |
| *H04L 12/26* | (2006.01) | |
| *H04W 4/021* | (2018.01) | |
| *H04W 4/02* | (2018.01) | |
| *H04W 12/61* | (2021.01) | |
| *H04W 12/63* | (2021.01) | |

(52) U.S. Cl.
CPC ....... *G06Q 10/105* (2013.01); *H04L 41/0843* (2013.01); *H04L 41/12* (2013.01); *H04L 43/0876* (2013.01); *H04L 63/102* (2013.01); *H04L 63/107* (2013.01); *H04L 63/108* (2013.01); *H04W 4/021* (2013.01); *H04W 4/029* (2018.02); *H04W 4/50* (2018.02); *H04W 8/18* (2013.01); *H04W 12/08* (2013.01); *H04W 12/37* (2021.01); *G06F 2221/033* (2013.01); *H04L 41/0806* (2013.01); *H04W 4/02* (2013.01); *H04W 12/61* (2021.01); *H04W 12/63* (2021.01)

(58) Field of Classification Search
CPC ........ G06F 21/62; G06F 21/629; G06F 21/88; H04W 64/00; H04W 4/02; H04W 4/00; H04W 4/029; H04W 4/50; H04W 12/0027; H04W 4/021; H04W 8/18; H04W 12/08; H04W 24/00; H04W 4/16; G06Q 10/10; G06Q 10/06; G06Q 10/06314; G06Q 10/105; H04L 12/26; H04L 12/24; H04L 41/0843; H04L 41/12; H04L 43/0876; H04L 63/102; H04L 63/107; H04L 63/108; H04L 29/06; G01C 21/00; G01C 21/20; G01S 5/0289; G01S 5/02; G08B 1/08; G08B 13/14; G08B 21/00; G08B 21/0266; G08B 21/22; G08B 21/0269; G08B 13/1427; G06N 5/02; G06N 5/04
See application file for complete search history.

(56) References Cited

U.S. PATENT DOCUMENTS

| | | |
|---|---|---|
| 5,864,683 A | 1/1999 | Boebert |
| 5,928,329 A | 1/1999 | Clark |
| 5,961,590 A | 10/1999 | Mendez |
| 5,974,238 A | 10/1999 | Chase |
| 5,987,609 A | 11/1999 | Hasebe |
| 6,021,492 A | 2/2000 | May |
| 6,023,708 A | 2/2000 | Mendez |
| 6,078,260 A | 6/2000 | Desch |
| 6,085,192 A | 7/2000 | Mendez |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,269,369 B1 | 7/2001 | Robertson |
| 6,463,470 B1 | 10/2002 | Mohaban |
| 6,560,772 B1 | 5/2003 | Slinger |
| 6,606,662 B2 | 8/2003 | Nagasaki |
| 6,708,221 B1 | 3/2004 | Mendez |
| 6,714,859 B2 | 3/2004 | Jones |
| 6,726,106 B1 | 4/2004 | Han |
| 6,727,856 B1 | 4/2004 | Hill |
| 6,741,232 B1 | 5/2004 | Siedlikowski |
| 6,741,927 B2 | 5/2004 | Jones |
| 6,766,454 B1 | 7/2004 | Riggins |
| 6,779,118 B1 | 8/2004 | Ikudome |
| 6,904,359 B2 | 6/2005 | Jones |
| 6,965,876 B2 | 11/2005 | Dabbiere |
| 6,995,749 B2 | 2/2006 | Friend |
| 7,032,181 B1 | 4/2006 | Farcasiu |
| 7,039,394 B2 | 5/2006 | Bhaskaran |
| 7,039,679 B2 | 5/2006 | Mendez |
| 7,064,688 B2 | 6/2006 | Collins |
| 7,092,943 B2 | 8/2006 | Roese |
| 7,107,339 B1 | 9/2006 | Wolters |
| 7,184,801 B2 | 2/2007 | Farcasiu |
| 7,191,058 B2 | 3/2007 | Laird |
| 7,203,959 B2 | 4/2007 | Nachenberg |
| 7,225,231 B2 | 5/2007 | Mendez |
| 7,228,383 B2 | 6/2007 | Friedman |
| 7,275,073 B2 | 9/2007 | Ganji |
| 7,284,045 B1 | 10/2007 | Marl |
| 7,287,271 B1 | 10/2007 | Riggins |
| 7,308,703 B2 | 12/2007 | Wright |
| 7,310,535 B1 | 12/2007 | MacKenzie |
| 7,353,533 B2 | 4/2008 | Wright |
| 7,363,349 B2 | 4/2008 | Friedman |
| 7,363,361 B2 | 4/2008 | Tewari |
| 7,373,517 B1 | 5/2008 | Riggins |
| 7,430,757 B1 | 9/2008 | Chari |
| 7,437,752 B2 | 10/2008 | Heard |
| 7,444,375 B2 | 10/2008 | McConnell |
| 7,447,506 B1 | 11/2008 | MacKenzie |
| 7,447,799 B2 | 11/2008 | Kushner |
| 7,448,023 B2 | 11/2008 | Chory |
| 7,475,152 B2 | 1/2009 | Chan |
| 7,496,957 B2 | 2/2009 | Howard |
| 7,539,665 B2 | 5/2009 | Mendez |
| 7,496,847 B2 | 6/2009 | Koehane |
| 7,543,146 B1 | 6/2009 | Karandikar |
| 7,565,314 B2 | 7/2009 | Borgeson |
| 7,590,403 B1 | 9/2009 | House |
| 7,594,224 B2 | 9/2009 | Patrick |
| 7,603,547 B2 | 10/2009 | Patrick |
| 7,603,548 B2 | 10/2009 | Patrick |
| 7,603,703 B2 | 10/2009 | Craft |
| 7,617,222 B2 | 11/2009 | Coulthard |
| 7,620,001 B2 | 11/2009 | Ganji |
| 7,620,392 B1 | 11/2009 | Maurya |
| 7,650,491 B2 | 1/2010 | Craft |
| 7,660,902 B2 | 2/2010 | Graham |
| 7,665,118 B2 | 2/2010 | Mann |
| 7,665,125 B2 | 2/2010 | Heard |
| 7,685,645 B2 | 3/2010 | Doyle |
| 7,702,322 B1 | 4/2010 | Maurya |
| 7,702,785 B2 | 4/2010 | Bruton |
| 7,735,112 B2 | 6/2010 | Kim |
| 7,735,122 B1 | 6/2010 | Johnson |
| 7,739,334 B1 | 6/2010 | Ng |
| 7,752,166 B2 | 7/2010 | Quinlan |
| 7,769,394 B1 | 8/2010 | Zhu |
| 7,788,382 B1 | 8/2010 | Jones |
| 7,792,297 B1 | 9/2010 | Piccionelli |
| 7,840,631 B2 | 11/2010 | Farcasiu |
| 7,890,091 B2 | 2/2011 | Puskoor |
| 7,912,896 B2 | 3/2011 | Wolovitz |
| 7,916,845 B2 * | 3/2011 | Rae ............... H04M 7/006 379/188 |
| 7,917,641 B2 | 3/2011 | Crampton |
| 7,970,386 B2 | 6/2011 | Bhat |
| 7,991,697 B2 | 8/2011 | Fransdonk |
| 8,001,082 B1 | 8/2011 | Muratov |
| 8,012,219 B2 | 9/2011 | Mendez |
| 8,041,776 B2 | 10/2011 | Friedman |
| 8,046,823 B1 | 10/2011 | Begen |

(56) References Cited

U.S. PATENT DOCUMENTS

| | | |
|---|---|---|
| 8,060,074 B2 | 11/2011 | Danford |
| 8,069,144 B2 | 11/2011 | Quinlan |
| 8,078,157 B2 | 12/2011 | Maurya |
| 8,094,591 B1 | 1/2012 | Hunter |
| 8,108,687 B2 | 1/2012 | Ellis |
| 8,117,344 B2 | 2/2012 | Mendez |
| 8,150,431 B2 | 4/2012 | Wolovitz |
| 8,166,106 B2 | 4/2012 | Biggs |
| 8,214,862 B1 | 7/2012 | Lee |
| 8,224,351 B1* | 7/2012 | Sushkov ............ G01S 5/0289 455/456.1 |
| 8,225,381 B2 | 7/2012 | Lemke |
| 8,332,350 B2 | 12/2012 | Pulfer |
| 8,456,293 B1 | 6/2013 | Trundle |
| 2002/0013721 A1 | 1/2002 | Dabbiere |
| 2002/0049580 A1 | 4/2002 | Kutaragi |
| 2002/0055967 A1 | 5/2002 | Coussement |
| 2002/0157019 A1 | 10/2002 | Kadyk |
| 2003/0020623 A1 | 1/2003 | Cao |
| 2003/0065950 A1 | 4/2003 | Yarborough |
| 2003/0110084 A1 | 6/2003 | Eberhard |
| 2003/0164853 A1 | 9/2003 | Zhu |
| 2003/0172166 A1 | 9/2003 | Judge |
| 2003/0204716 A1 | 10/2003 | Rockwood |
| 2004/0123153 A1 | 6/2004 | Wright |
| 2004/0181687 A1 | 9/2004 | Nachenberg |
| 2004/0203768 A1 | 10/2004 | Ylitalo |
| 2004/0224703 A1 | 11/2004 | Takaki |
| 2005/0071748 A1 | 3/2005 | Shipp |
| 2005/0097032 A1 | 5/2005 | Benco |
| 2005/0097327 A1 | 5/2005 | Ondet |
| 2005/0181808 A1 | 8/2005 | Vaudreuil |
| 2005/0246192 A1 | 11/2005 | Jauffred |
| 2005/0272445 A1 | 12/2005 | Zellner |
| 2006/0013566 A1 | 1/2006 | Nakamura |
| 2006/0059100 A1 | 3/2006 | Ronning |
| 2006/0067250 A1 | 3/2006 | Boyer |
| 2006/0132304 A1* | 6/2006 | Cabell ............ G08B 21/0266 340/539.23 |
| 2006/0190984 A1 | 8/2006 | Heard |
| 2006/0234793 A1 | 10/2006 | Walker |
| 2007/0033397 A1 | 2/2007 | Phillips, II |
| 2007/0130473 A1 | 6/2007 | Mazotas |
| 2007/0136492 A1 | 6/2007 | Blum |
| 2007/0156897 A1 | 7/2007 | Lim |
| 2007/0162417 A1 | 7/2007 | Cozianu |
| 2007/0174433 A1 | 7/2007 | Mendez |
| 2007/0261099 A1 | 11/2007 | Broussard |
| 2007/0288637 A1 | 12/2007 | Layton |
| 2008/0010689 A1 | 1/2008 | Ooi |
| 2008/0065727 A1 | 3/2008 | Majors |
| 2008/0070593 A1 | 3/2008 | Altman |
| 2008/0125102 A1 | 5/2008 | Abel |
| 2008/0133712 A1 | 6/2008 | Friedman |
| 2008/0134305 A1 | 6/2008 | Hinton |
| 2008/0134347 A1 | 6/2008 | Goyal |
| 2008/0160984 A1 | 7/2008 | Benes |
| 2008/0201453 A1 | 8/2008 | Assenmacher |
| 2008/0228504 A1 | 9/2008 | Nguyen |
| 2008/0301057 A1 | 12/2008 | Oren |
| 2008/0307219 A1 | 12/2008 | Karandikar |
| 2008/0318548 A1 | 12/2008 | Bravo |
| 2009/0036111 A1 | 2/2009 | Danford |
| 2009/0089565 A1 | 4/2009 | Buchanan |
| 2009/0144632 A1 | 6/2009 | Mendez |
| 2009/0186633 A1 | 7/2009 | Yonker |
| 2009/0198997 A1 | 8/2009 | Yeap |
| 2009/0203375 A1 | 8/2009 | Gisby |
| 2009/0260064 A1 | 10/2009 | McDowell |
| 2009/0298514 A1 | 12/2009 | Ullah |
| 2009/0300739 A1 | 12/2009 | Nice |
| 2009/0307362 A1 | 12/2009 | Mendez |
| 2010/0005125 A1 | 1/2010 | Mendez |
| 2010/0005157 A1 | 1/2010 | Mendez |
| 2010/0005159 A1 | 1/2010 | Ishiguro |
| 2010/0005195 A1 | 1/2010 | Mendez |
| 2010/0023630 A1 | 1/2010 | Mendez |
| 2010/0083359 A1 | 4/2010 | Readshaw |
| 2010/0091711 A1 | 4/2010 | Sawai |
| 2010/0100641 A1 | 4/2010 | Quinlan |
| 2010/0100972 A1 | 4/2010 | Lemieux |
| 2010/0120450 A1 | 5/2010 | Herz |
| 2010/0131527 A1 | 5/2010 | Wohlert |
| 2010/0131844 A1 | 5/2010 | Wohlert |
| 2010/0138667 A1 | 6/2010 | Adams |
| 2010/0144323 A1 | 6/2010 | Collins |
| 2010/0146269 A1 | 6/2010 | Baskaran |
| 2010/0191837 A1 | 6/2010 | Linden |
| 2010/0222645 A1 | 9/2010 | Nadler |
| 2010/0254410 A1 | 10/2010 | Collins |
| 2010/0268844 A1 | 10/2010 | Quinlan |
| 2010/0273456 A1 | 10/2010 | Wolovitz |
| 2010/0299152 A1 | 11/2010 | Batch |
| 2010/0299362 A1 | 11/2010 | Osmond |
| 2010/0299376 A1 | 11/2010 | Batch |
| 2010/0299719 A1 | 11/2010 | Burks |
| 2010/0317371 A1 | 12/2010 | Westerinen |
| 2010/0318701 A1 | 12/2010 | Srinivasan |
| 2011/0004941 A1 | 1/2011 | Mendez |
| 2011/0039506 A1 | 2/2011 | Lindahl |
| 2011/0082900 A1 | 4/2011 | Nagpal |
| 2011/0113062 A1 | 5/2011 | Quinlan |
| 2011/0113094 A1 | 5/2011 | Chunilal |
| 2011/0135083 A1 | 6/2011 | Lingafelt |
| 2011/0136510 A1 | 6/2011 | Peterson |
| 2011/0141276 A1 | 6/2011 | Borghei |
| 2011/0145932 A1 | 6/2011 | Nerger |
| 2011/0153779 A1 | 6/2011 | Mendez |
| 2011/0153799 A1 | 6/2011 | Ito |
| 2011/0167474 A1 | 7/2011 | Sinha |
| 2011/0202589 A1 | 8/2011 | Piernot |
| 2011/0225252 A1 | 9/2011 | Bhat |
| 2011/0270799 A1 | 11/2011 | Muratov |
| 2011/0276805 A1 | 11/2011 | Nagpal |
| 2011/0296186 A1 | 12/2011 | Wong |
| 2011/0320552 A1 | 12/2011 | Fiedman |
| 2012/0005578 A1 | 1/2012 | Hawkins |
| 2012/0015644 A1 | 1/2012 | Danford |
| 2012/0054385 A1 | 3/2012 | Lim |
| 2012/0094639 A1 | 4/2012 | Carlson |
| 2012/0102392 A1 | 4/2012 | Reesman |
| 2012/0115453 A1 | 5/2012 | Zheng |
| 2012/0190386 A1 | 7/2012 | Anderson |
| 2012/0198547 A1 | 8/2012 | Fredette |
| 2012/0272287 A1 | 10/2012 | Kuhlke |
| 2012/0288091 A1 | 11/2012 | Honke |
| 2012/0289153 A1 | 11/2012 | Dobyns |
| 2012/0290544 A1 | 11/2012 | Abuelsaad |
| 2012/0311329 A1 | 12/2012 | Medina |
| 2012/0311686 A1 | 12/2012 | Medina |
| 2013/0007245 A1 | 1/2013 | Malik |
| 2013/0040604 A1 | 2/2013 | Sprigg |
| 2013/0040629 A1 | 2/2013 | Sprigg |
| 2013/0055363 A1 | 2/2013 | Dattagupta |
| 2013/0061307 A1 | 3/2013 | Livne |
| 2013/0086466 A1 | 4/2013 | Levy |
| 2013/0132854 A1 | 5/2013 | Raleigh |
| 2013/0152169 A1 | 6/2013 | Stuntebeck |
| 2013/0165232 A1 | 6/2013 | Nelson |
| 2013/0174223 A1 | 7/2013 | Dykeman |
| 2013/0244614 A1 | 9/2013 | Santamaria |
| 2013/0275038 A1 | 10/2013 | Hania |
| 2013/0283370 A1 | 10/2013 | Vipat |
| 2014/0013420 A1 | 1/2014 | Picionielli |
| 2014/0025256 A1 | 1/2014 | Armitage |
| 2014/0066098 A1 | 3/2014 | Stern |
| 2014/0068717 A1 | 3/2014 | Mayes |
| 2014/0082501 A1 | 3/2014 | Bae |
| 2014/0096180 A1 | 4/2014 | Negi |
| 2014/0143852 A1 | 5/2014 | Cottrell |
| 2014/0177495 A1 | 6/2014 | Mallikarjunan |
| 2014/0214668 A1 | 7/2014 | Lotter |
| 2014/0258481 A1 | 9/2014 | Lundell |

(56) References Cited

U.S. PATENT DOCUMENTS

| | | |
|---|---|---|
| 2014/0310771 A1 | 10/2014 | Marshall |
| 2015/0207795 A1 | 7/2015 | Wentz |
| 2017/0269955 A1 | 9/2017 | Hardy |

FOREIGN PATENT DOCUMENTS

| | | |
|---|---|---|
| JP | 2007304009 | 11/2007 |
| JP | 2011234084 | 11/2011 |
| WO | WO9600485 | 1/1996 |
| WO | WO0003316 | 1/2000 |
| WO | WO02141661 | 5/2002 |
| WO | WO2010052669 | 5/2010 |
| WO | 2013011512 | 1/2013 |
| WO | WO2013109040 | 7/2013 |

OTHER PUBLICATIONS

Patent Examination Report No. 1 for Australian application No. 2014259666, dated Aug. 11, 2016.

International Search Report for PCT/US2015/066891 dated Apr. 11, 2016.

International Search Report for PCT/US2014/025256 dated Jul. 3, 2014.

Asynchrony Software, Inc., "PDS Defense User Guide", 726, 2002.

Belani, Eshware et al., "The CRISIS Wide Area Security Architecture", 726, 1998.

Benaloh, Josh et al., "Patient Controlled Encryption: Ensuring Privacy of Electronic Medical Records", 726, 2009.

Fox, Armando et al., "Security on the Move: Indirect Authentication Using Kerberos", 726, 1996.

Maneria, Pankaj et al., "Security in Mobile Database Systems", 707, 726, 2011.

Pfitzmann, Andreas et al., "Mobile User Devices and Security Modules: Design for Trustworthiness", 726, 1996.

Strunk, John et al., "Self-Securing Storage: Protecting Data in Compromised Systems", Symposium on Operating Systems Design and Implementation, 726, 2000.

International Search Report for PCT/US2014/036668 dated Aug. 28, 2014.

* cited by examiner

LOCATION-BASED CONFIGURATION PROFILE TOGGLING

RELATED APPLICATION

This application claims priority as a continuation of U.S. patent application Ser. No. 15/176,686, filed Jun. 8, 2016, which is a continuation of U.S. patent application Ser. No. 13/875,426, filed May 2, 2013, both of which are expressly incorporated by reference herein. Related U.S. patent application Ser. No. 13/875,414, filed May 2, 2013 and entitled "TIME-BASED CONFIGURATION PROFILE TOGGLING," assigned to the assignee of the present application, is also hereby incorporated by reference.

BACKGROUND

In some situations, user devices may have access to one or more configuration profiles that may be enabled on the user devices. The configuration profiles may, for instance, configure the user device for personal and/or business use, such as configuring email accounts, applications, hardware features, software features and/or the like. Conventional approaches of using such persona-specific configuration profiles include providing a user device with access to only one of either personal configuration profiles or business configuration profiles to control which persona is enabled on the user device at the proper time. For instance, an Information Technology (IT) administrator may manually enable a set of business configuration profiles on a user device owned by the business upon hiring a new employee that will use such user device for tasks related to the business. The IT administrator may further, upon an authorized condition, disable the business configuration profiles on the user device and enable the personal configuration profiles on the user device to the employee to use the user device for tasks related to the employee's personal affairs.

SUMMARY

This Summary is provided to introduce a selection of concepts in a simplified form that are further described below in the Detailed Description. This Summary is not intended to identify key features or essential features of the claimed subject matter, nor is this Summary intended to limit the scope of the claimed subject matter.

Location-based configuration profile toggling may be provided. A user device may be instructed to enable a configuration profile if it is determined that the user device is authorized to enable the configuration profile based at least in part on a current location associated with the user device. Additionally, a user device may be instructed to disable a configuration profile if it determined that the user device is not authorized to enable the configuration profile based at least in part on a current location associated with the user device. A user device may thereby be, for instance, instructed to toggle between personal configuration profiles and business configuration profiles based on a configured office location. More specifically, the user device may be instructed to enable business configuration profiles upon entering the office location, disable personal configuration profiles upon entering the office location, enable personal configuration profiles upon leaving the office location and disable business configuration profiles upon leaving the office location.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
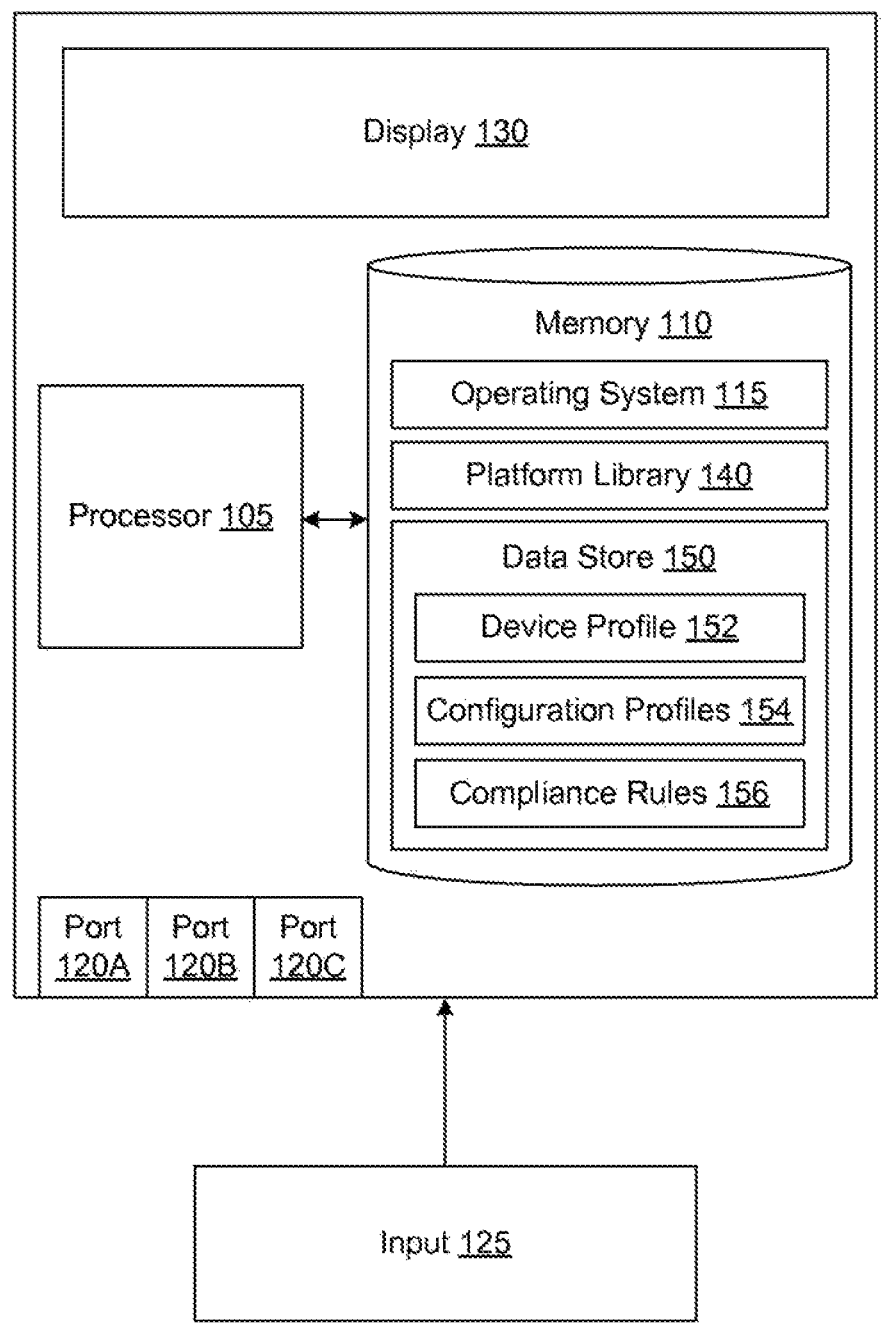
FIG. 1 is a block diagram of a user device.

The following Detailed Description refers to the accompanying Drawings. Wherever possible, the same reference numbers are used in the Drawings and the following Detailed Description to refer to the same or similar elements. While embodiments of the disclosure may be described, modifications, adaptations, and other implementations of the disclosure are possible. For example, substitutions, additions, or modifications may be made to the elements illustrated in the Drawings without departing from the spirit and scope of the disclosure. The methods described herein may be also modified by substituting, reordering, or adding stages to the methods without departing from the spirit and scope of the disclosure. Accordingly, the following Detailed Description does not limit the disclosure; instead, the proper scope of the disclosure is defined by the appended Claims.

Location-based configuration profile toggling may be provided. To reduce the cost of ownership of user devices and cellular and/or data service charges associated with use of such user devices a business may implement a "bring your own device" (BYOD) policy to allow an employee to use her personal device to access business resources rather than provide the employee with a business owned user device for such purpose. To support such a BYOD policy, a user device administrator (i.e. IT administrator) may manage a group of personally owned user devices, via a management application executed by a management server in communication with the user devices over a network, to provide the user devices with secure access to business resources.

The user device administrator may enroll user devices into the management system to monitor the user devices for security vulnerabilities and to configure the user devices for secure access to business resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure a business email configuration profile by specifying the network address and access credentials of a business email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of employees with similar roles, privileges and/or titles.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of a user device, such as a personal email configuration profile and a business email configuration profile that are both used for accessing email accounts on the user device.

Location-based configuration profile toggling may be provided, which may ensure the security of business resources and/or to ensure the productivity of employee users of user devices with access to business resources. User devices may be instructed to enable certain configuration profiles and/or disable certain configuration profiles based at least in part on the current location associated with the user devices. More specifically, user devices may be instructed to toggle between personal configuration profiles and business configuration profiles based on a configured office location. The user device administrator may instruct the user devices to enable and/or disable certain configuration profiles via an agent application executed on the user devices, which may be installed on the user devices upon enrollment into the BYOD management system. Alternatively, the user device administrator may instruct the user devices to enable and/or disable certain configuration profiles via application programming interface (API) calls to the operating system of the user devices, which may be remotely transmitted from the management system to the user devices over a cellular and/or data network.

In any case, the user devices may be instructed to enable and/or disable certain configuration profiles according to authorization rights specified by the user device administrator, such as location-based authorization rights. For example, a BYOD policy may specify that user devices enrolled in the BYOD management system are authorized for personal use outside of the workplace and are authorized for business use inside the workplace. To implement such a policy, a user device administrator may instruct the user devices to toggle between personal configuration policies and business configuration policies based on the current location associated with the user device, which may be determined by GPS, Wi-Fi, cellular network tower triangulation, and/or the like. As an example, location-based configuration profile toggling may be provided by instructing a user device to enable business configuration profiles and disable personal configuration profiles when the current location of the user device is within a configured office location, and to disable business configuration profiles and enable personal configuration profiles when the current location of the use device is outside the configured office location.

Time-based configuration profile toggling may be provided, which may ensure the security of business resources and/or to ensure the productivity of employee users of user devices with access to business resources. User devices may be instructed to enable certain configuration profiles and/or disable certain configuration profiles based at least in part on the current time associated with the user devices. More specifically, devices may be instructed to toggle between personal configuration profiles and business configuration profiles based on a configured workday. The user device administrator may instruct the user devices to enable and/or disable certain configuration profiles via an agent application executed on the user devices, which may be installed on the user devices upon enrollment into the BYOD management system. Alternatively, the user device administrator may instruct the user devices to enable and/or disable certain configuration profiles via application programming interface (API) calls to the operating system of the user devices, which may be remotely transmitted from the management system to the user devices over a cellular and/or data network.

In any case, the user devices may be instructed to enable and/or disable certain configuration profiles according to authorization rights specified by the user device administrator, such as time-based authorization rights. For example, a BYOD policy may specify that user devices enrolled in the BYOD management system are authorized for personal use outside of the workday and are authorized for business use during the workday. To implement such a policy, a user device administrator may instruct the user devices to toggle between personal configuration policies and business configuration policies based on the current time associated with the user device. The current time may be based on the current time at the current location of the user device, which may be determined by GPS, Wi-Fi, cellular network tower triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 is a block diagram of a user device 100, which may comprise a smart phone, cellular telephone, personal digital assistant, tablet computer system, web pad, laptop computer, desktop computer, set-top box, music player, game console, and/or another device with like capability. User device 100 may comprise a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks optical disks, or tape (not shown).

User device 100 may store in a data store 150 a device profile 152. Device profile 152 may comprise one or more indications of the state of user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100.

The device profile 152 may further comprise data indicating a date of last virus scan of user device 100, a date of last access by an IT representative, a date of last service by the IT representative, and/or any other data indicating maintenance and usage of user device 100. Moreover, the device profile 152 may comprise indications of the past behavior of associated users, such as resources accessed, charges for resource accesses, and the inventory accessed from such resources. Furthermore, device profile 152 may indicate a current location associated with user device 100 and/or a current time associated with user device 100. Device profile 152 may, for example, comprise data accessible to user device 100 via functions of user device 100, such as GPS location data and/or via remote services communicatively coupled to user device 100, such as current time data provided by a remote time service.

User device 100 may also store one or more configuration profiles 154 in data store 150. Configuration profiles 154 may comprise settings, plug-ins, configuration files and/or other data capable of configuring, controlling, and/or influencing the operations and/or functions of user device 100. Configuration profiles 154 may specify how user device 100 may perform certain functions of the user device 100, such as a camera, touchscreen, microphone or other function provided by user device 100. Configuration profiles 154 may, for example, comprise configuration profiles 154 specific to Apple iOS, Apple OSX, Samsung KNOX, Samsung SAFE, Google Android, Windows Mobile, Windows 8, Blackberry 10, Symbian, and/or other user device 100 operating systems 115. Configuration profiles 154 may utilize an application programming interface (API) to communicate the specifications and/or requirements of the configuration profiles 154 to operating system 115 of user device 100.

Configuration profiles 154 may also specify a series of authorized sub functions that user device 100 may perform in response to a request to perform certain unauthorized functions of user device 100. Such configuration profiles 154, or macros, may provide similar and/or equivalent functions to requested functions through a series of authorized sub-functions of user device 100. In some embodiments, configuration profiles 154 may specify that user device 100 may enable a data network calling function when a cellular network calling function is disabled on user device 100 and a request to perform such cellular network calling function is received by user device 100. For example, user device 100 may interface with a Voice-over-Internet Protocol (VoIP) provider, such as Skype, may create a VoIP account and/or enroll into a group account associated with the user device 100, and may download, install, and execute a VoIP application. In other embodiments, configuration profiles 154 may specify that user device 100 may interface with a cellular network carrier and/or provider to enable an international calling plan when the user device 100 is located outside of the United States and a request to perform a cellular network calling function is received by user device 100. In further embodiments, configuration profiles 154 may specify that user device 100 may enable a data network messaging function when a short message service (SMS) messaging function is disabled on user device 100 and a request to perform such SMS messaging function is received by user device 100. For instance, user device 100 may interface with an application store associated with the user device 100 and may download, install, and execute a data messaging application, such as Apple iMessage, Blackberry Messenger, and/or the like.

Configuration profiles 154 may comprise personal configuration profiles 154. Personal configuration profiles 154 may comprise configuration profiles 154 created by a user of user device 100 by configuring certain personal data, personal applications, personal software features, and/or personal hardware features of user device 100. Personal configuration profiles 154 may, for example, comprise configuration profiles 154 that provide access to a personal email account.

Configuration profiles 154 may further comprise business and/or enterprise configuration profiles 154. Business configuration profiles 154 may comprise configuration profiles 154 created by a user device 100 administrator of user device 100 by configuring certain business data, business applications, business software features, and/or business hardware features of user device 100. Business configuration profiles 154 may be configured by a user device 100 administrator via a management server 210 and, thereafter, distributed to the user device 100 via a network 240 transmission. Business configuration profiles 154 may, for example, configuration profiles 154 that provide access to a business file repository.

Moreover, user device 100 may store one or more compliance rules 156. Compliance rules 156 may specify conditions and/or events required for user device 100 to perform certain functions on user device 100. In some embodiments, compliance rules 156 may specify that user device 100 must satisfy and/or comply with a single condition for user device 100 to be authorized to perform certain functions of user device 100 associated with the compliance rules 156. For instance, compliance rules 156 may require that user device 100 is associated with a current time that is within an authorized time period specified by such compliance rules 156 in order for user device 100 to be authorized to perform certain functions of user device 100. More specifically, compliance rules 156 may specify that user device 100 is authorized to access a business email account while the system clock of user device 100 is within a configured workday and is not authorized to access the business email account while the system clock of user device 100 is outside of the configured workday.

In some embodiments, compliance rules 156 may specify that user device 100 must satisfy and/or comply with more than one condition for user device 100 to be authorized to perform certain functions of user device 100 associated with the compliance rules 156. For example, compliance rules 156 may specify that user device 100 must be associated with a "safe zone" location to perform certain functions of user device 100, which may require that both a GPS sensor of user device 100 indicates that user device 100 is currently located within the safe zone and a Wi-Fi network access point associated with the safe zone is communicatively coupled to and/or enrolled with the Wi-Fi network access point.

In some embodiments, compliance rules 156 may specify that user device 100 and another computing device, similar to and/or identical to user device 100, satisfy and/or comply with one or more conditions for user device 100 to be authorized to perform certain functions of user device 100 associated with the compliance rules 156. Compliance rules 156 may require that user device 100 be located within proximity of and/or be communicatively coupled to a secondary user device 100 and that both user devices 100 be located within an authorized location in order to perform certain functions of user device 100. As an example, compliance rules 156 may specify that user devices 100 associated with nurses y only access medical records of patients while the user devices 100 associated with the nurses are located within 10 feet of user devices 100 associated with such patients and both the user devices 100 associated with nurses and user devices 100 associated with patients are located within examination rooms specific to the patients' appointments.

In some embodiments, compliance rules 156 may be granular such that user device 100 may be authorized to perform different functions depending on how many of the conditions of the compliance rules 156 are satisfied by user device 100. For example, user device 100 may be authorized to access a business contact list on user device 100 if a GPS sensor on user device 100 indicates that user device 100 is located within the business's office location, but user device 100 may be prohibited from sending a business email until it is confirmed that user device 100 is located within a "safe zone" by being communicatively coupled to a Wi-Fi network access point associated with the business's office location.

In any case, compliance rules 156 may be associated with configuration profiles 154 such that compliance rules 156 may determine whether user device 100 is authorized to enable configuration profiles 154 on user device 100. For instance, compliance rules 156 may specify that certain configuration profiles 154 may only be enabled on user device 100 while a current time associated with user device 100 is within an authorized time period specified by compliance rules 156, as within a configured workday. User device 100 may receive configuration profiles 154 and compliance rules 156 from a user device 100 management service communicatively coupled to user device 100. User device 100 may receive a distribution of configuration profiles 154 and compliance rules 156 from a user device 100 management service "over the air," such as via a data network 240.

An agent application on user device 100 may determine whether compliance rules 156 are satisfied, for instance, by determining whether device profile 152 satisfies compliance rules 156. For instance agent application may determine whether device profile 152 specifies that the current time associated with user device 100 is within a configured workday specified by compliance rules 156. Alternatively, user device 100 may transmit all and/or a portion of device profile 152 to a user device 100 management service that may determine whether user device 100 satisfies compliance rules 156. In any case, user device 100 may be authorized and/or instructed to perform functions of user device 100 according to the specifications of configuration profiles 154 in response to a determination that user device 100 complies with compliance rules 156 associated with such configuration profiles 154.

Figure 2:
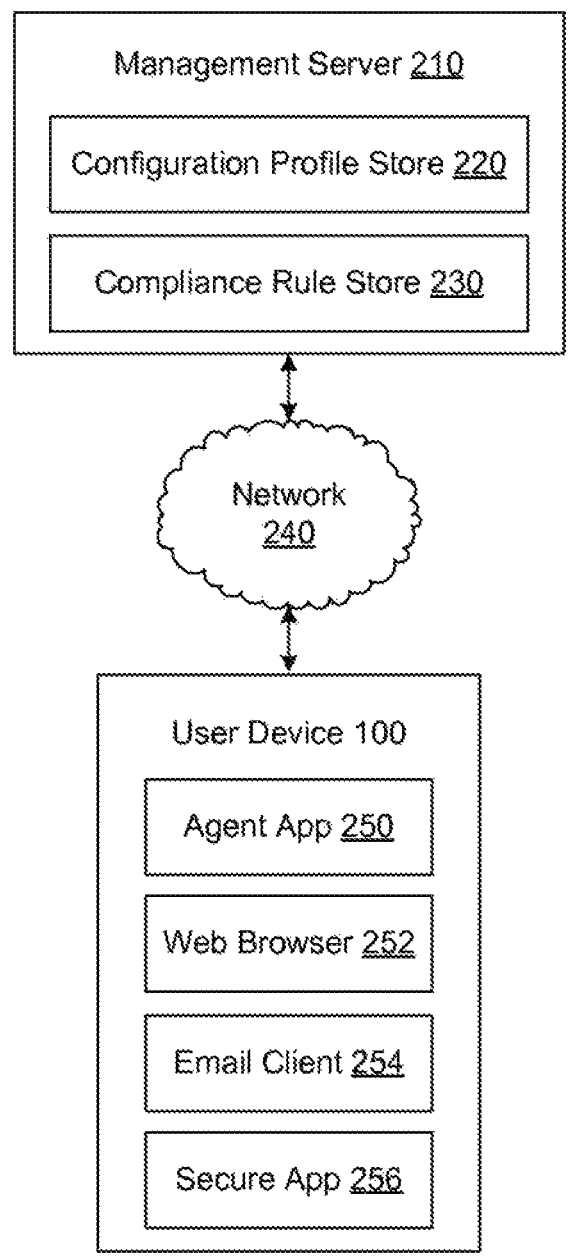
FIG. 2 is a block diagram of an operating environment.

FIG. 2 is a block diagram view of an operating environment 200 comprising user device 100 in communication with a management server 210 via a network 240. The management server 210 may comprise, for example, cloud-based solutions, server computers and/or any other system providing user device 100 management capability. For purposes of convenience, the management server 210 is referred to herein in the singular, although it is understood that a plurality of servers may be employed in the arrangements as descried herein. Furthermore, in some embodiments, multiple management servers 210 may operate on the same server computer. The components executed on the management server 210, for example, may comprise various applications, services, processes, systems, engines, or functionality not disclosed in detail herein.

The management server 210 may comprise configuration profile store 220 comprising a plurality of configuration policies 154 that may be applicable to user device 100, as described herein. The management server 210 may further comprise a compliance rule store 230 comprising a plurality of compliance rules 156. While the configuration profile store 220 and compliance rule store 230 are shown as within the management server 210, the configuration profile store 220 and compliance rule store 230 may alternately be within the user device 100 and/or remotely located on a file server and may be remotely updated periodically by management server 210 according to common over-the-air (OTA) updating methods.

As described herein, requests and/or attempts by user device 100 to perform certain functions on user device 100 may require user device 100 to be in compliance with compliance rules 156 stored, which may be stored in compliance rule store 220. Further, if the user device 100 complies with compliance rules 156 associated with the requested functions of user device 100, user device 100 may provide the functions in accordance with configuration profiles 154, which may be stored in configuration profile store 220. Depending on the sensitivity of a given functionality, different compliance rules 156 may be necessary to ensure that the functionality is adequately restricted. Some functionality may only require ensuring that the proper user is requesting the functionality. Other resources may require compliance with more stringent authorization rules, such as determining whether the functionality is restricted within and/or outside of certain locations. Accordingly, user device 100 and/or management server 210 may be operative to determine whether a user of user device 100 is authorized to perform requested functionality upon the users request to perform such functionality.

In some embodiments, an agent application 250 executed on user device 100 may make the compliance determination based on a device profile 152, user credentials, and/or user preferences. For instance, the agent application 250 may monitor calls by applications, such as web browser 252, an e-mail client 254, and/or a secure application 256, on user device 110 to the operating system 115 of user device 100 to determine whether user device 110 seeks to perform functionality associated with a given compliance rule 156. Additionally, the agent application 250 on user device 100 may approve and/or deny the associated functionality requests. For instance, the agent application 250 may instruct operating system 115 on user device 100 to enable certain configuration profiles 154 on user device 100 in response to a determination that user device 100 is authorized to enable the configuration profiles 154 based at least in part on the user devices 100 current location and compliance rules 156 associated with such configuration profiles 154 specifying at least one authorized location where the user device 100 is authorized to enable such configuration profiles 154.

While agent application 250 is depicted as a single application on user device 100 capable of determining whether user device 100 is authorized to perform functions of the user device 100, agent application 250 may comprise applications, plug-ins, application wrappers, and/or software developer kits (SDK) specific to certain functionality of user device 100. Accordingly, user device 100 may store a multitude of function-specific agent applications 250 that collectively communicate with operating system 115 of user device 100 and/or management server 210.

In some embodiments, the agent application 250 executed on user device 100 may rely on management server 210 to determine whether a given functionality request on user device 100 is authorized according to the compliance rules 156. For instance, the agent application may transmit a functionality request, a device profile 152, user credentials, and/or user preferences to management server 210 so that management server 210 may determine whether user device 110 seeks to perform functions of user device 100 that may violate certain compliance rules 156 associated with the functions. Additionally, management server 210 may approve and/or deny the associated functionality requests. For instance, the management server 210 may instruct operating system 115 on user device 100, via agent application 250 on user device 100, to disable certain configuration profiles 154 on user device 100 in response to a determination that user device 100 is not authorized to enable the configuration profiles 154 based at least in part on the user device's 100 current location and compliance rules 156 associated with such configuration profiles 154 specifying at least one authorized location where the user device 100 is not authorized to enable such configuration profiles 154.

The network 240 may comprise, for example, any type of wired and/or wireless network such as wireless local area network (WLAN), a wireless wide area network (WWAN), Ethernet, fiber-optic network, and/or any other type of wired and/or wireless network now known or later developed. Additionally, the network 240 may be or include the Internet, intranets, extranets, microwave networks, satellite communications cellular systems, PCS, infrared communications, global area networks, or other suitable networks, etc., or any combination of such networks 240.

Figure 3:
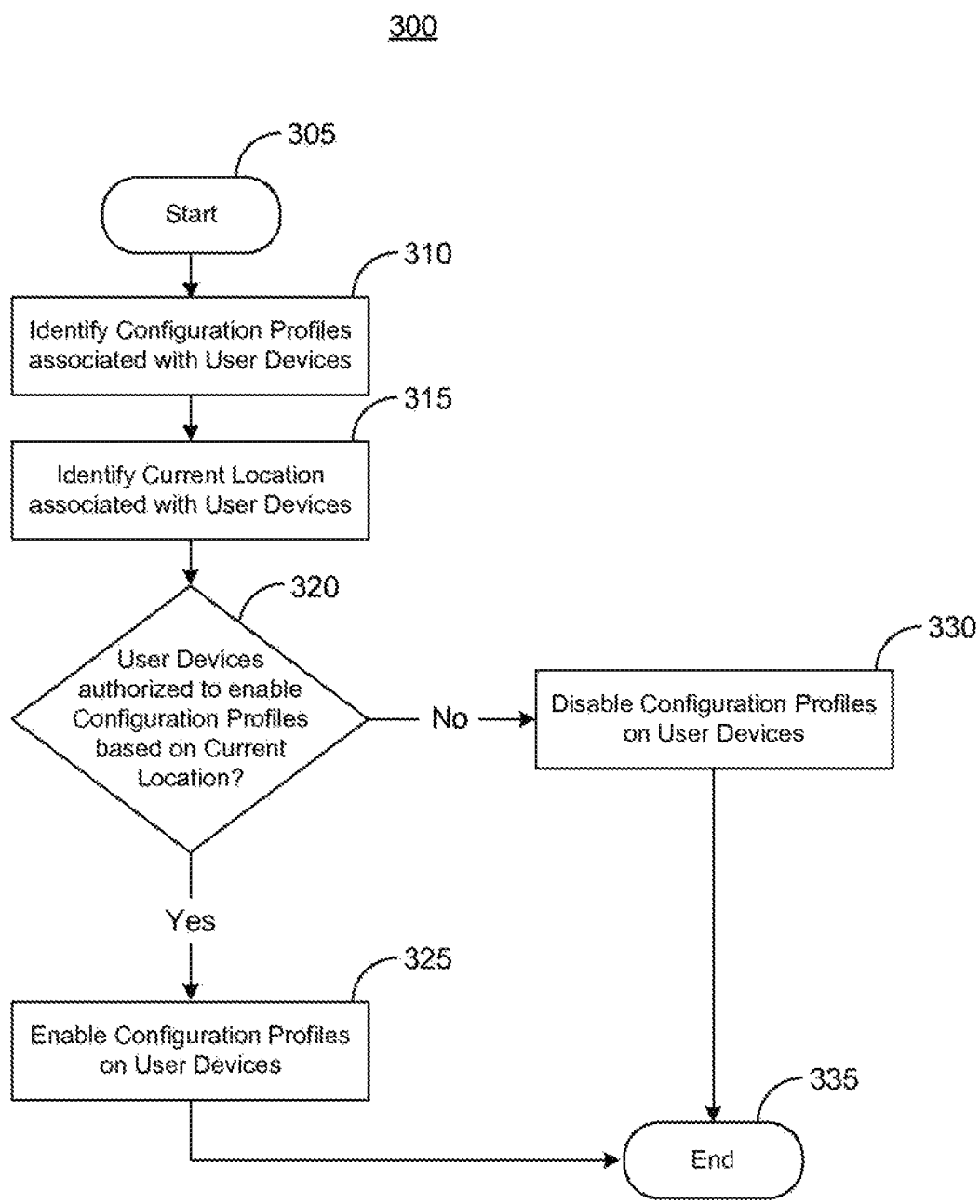
FIG. 3 is a flow chart illustrating a method for providing location-based configuration profile toggling.

FIG. 3 is a flow chart setting forth the general stages involved in a method 300 consistent with embodiments of this disclosure for providing location-based configuration profile toggling. Method 300 may be implemented using elements of operating environment 200 as described above. Ways to implement the stages of method 300 will be described in greater detail below.

Method 300 may begin at starting block 305 and proceed to stage 310 where configuration profiles 154 associated with one or more user devices 100 are identified. In some embodiments, method 300 may proceed to stage 310 in response to the user devices 100 receiving a request to perform certain functions on the user devices 100 that may be associated with such configuration profiles 154. In other embodiments, method 300 may proceed to stage 310 in response to the user devices 100 identifying configuration profiles 154 that are currently enabled on the user devices 100. For instance, an agent application 250 on the user devices 100 may periodically query the user device 100 to determine whether any configuration profiles 154 are enabled on the user devices 100.

In some embodiments, a user device 100 may query the data store 150 of user device 100 to determine whether any configuration profiles 154 are associated with the user device 100. In other embodiments, management sever 210 may query the configuration profile store 220 to determine whether any configuration profiles 154 stored within configuration profile store 220 are associated with a given user device 100. In yet further embodiments, user device 100 and/or management server 210 may query a remote file server to determine whether any configuration profiles 154 stored within the remote the server are associated with user device 100.

From stage 310, method 300 may advance to stage 315 where a current location associated with the user devices 100 is identified. In certain embodiments, compliance rules 156 associated with the configuration profiles 154 may specify that a current location associated with the user devices 100 must fall within certain authorized locations for the user device 100 to be authorized to enable the identified configuration profiles 156. In some embodiments, the user devices 100 may query one or more location detection functions of the user devices 100 to determine the current location of the user devices 100. For example, the user devices 100 may determine the current location of the user devices 100 via GPS, cell tower triangulation, network access points such as Wi-Fi hotspots, near field communication (NFC), and/or the like. In other embodiments, the management server 210 and/or other services communicatively coupled to the user devices 100 may identify the current location of the user devices 100.

From stage 315, method 300 may advance to stage 320 where method 300 determines whether the user devices 100 are authorized to enable the identified configuration profiles 154 on the user devices 100 based at least in part on the identified current location associated with the user devices 100. In some embodiments, an agent application 250 on user device 100 may determine whether the current location associated with user device 100 falls within at least one authorized location specified by the configuration profiles 154. In other embodiments, management server 210 may determine whether the current location associated with user device 100 falls within at least one authorized location specified by the configuration profiles 154. In yet a further embodiment, user devices 100 and/or management server 210 may transmit the identified configuration profiles 154 and identified current locations associated with the user devices 100 to a remote compliance service that may determine whether the current location associated with the user devices 100 falls within at least one authorized location specified by the configuration profiles 154 and may return a response to the user devices 100 and/or management server 210.

If it is determined that the user devices 100 are authorized to enable the identified configuration profiles 154 on the user devices 100 based at least in part on the identified current location associated with the user devices 100, method 300 may advance to stage 325 where the user devices 100 may enable the configuration profiles 154 on the user devices 100. In some embodiments, the user devices 100 may enable the configuration profiles 154 on the user devices 100 by instructing the operating systems 115 of the user devices 100 to one or more of download, install, activate, and execute the identified configuration profiles 154 on the user devices 100. In other embodiments, management server 210 may transmit instructions to the operating system 115 of the user devices 100 to one or more of download, install, activate, and execute the identified configuration profiles 154 on the user devices 100. Method 300 may then end at stage 335.

If, however, it is determined that the user devices 100 are not authorized to enable the identified configuration profiles 154 on the user devices 100 based at least in part on the identified current location associated with the user devices 100, method 300 may advance to stage 330 where the user devices 100 may disable the configuration profiles 154 on the user devices 100. In some embodiments, the user devices 100 may disable the configuration profiles 154 on the user devices 100 by instructing the operating systems 115 of the user devices 100 to one more of delete, uninstall, deactivate, and terminate the execution of the identified configuration profiles 154 on the user devices 100. In other embodiments, management server 210 may transmit instructions to the operating systems 115 of the user devices 100 to one or more of delete, uninstall, deactivate, and terminate the execution of the identified configuration profiles 154 on the user devices 100. Method 300 may then end at stage 335.

An embodiment consistent with the disclosure may comprise a method for providing location-based configuration profile toggling. The method may comprise identifying at least one configuration profile associated with at least one user device, determining whether said user device is authorized to enable said configuration profile on said user device based at least in part on a current location associated with said user device, and enabling said configuration profile on said user device in response to a determination that said user device is authorized to enable said configuration profile on said user device based at least in part on said current location associated with said user device.

Another embodiment consistent with the disclosure sway comprise a non-transitory computer-readable medium for providing location-based configuration profile toggling. The non-transitory computer-readable medium may store a set of instructions that when executed perform a method executed by the set of instructions. The method may comprise identifying at least one configuration profile enabled on at least one user device, determining whether said user device is authorized to enable said configuration profile on said user device based at least in part on a current location associated with said user device, and disabling said configuration profile on said user device in response to a determination that said user device is not authorized to enable said configuration profile on said user device based at least in part on said current location associated with said user device.

Yet another embodiment consistent with the disclosure may comprise a system for providing location-based configuration profile toggling. The system may comprise a memory storage and a processing unit coupled to the memory storage. The processing unit may be operative to identify at least one configuration profile associated with at least one user device, determine whether said user device is authorized to enable said configuration profile on said user device based at least in part on whether a current location associated with said user device complies with at least one compliance rule specifying at least one location where said user device is authorized to enable said configuration profile on said user device, and enable said configuration profile on said user device in response to a determination that said user device is authorized to enable said configuration profile on said user device based at least in part on said current location associated with said user device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure ay be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/ acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method for enforcing a compliance rule associated with a business email configuration profile, comprising:
providing the business email configuration profile from a management server to a mobile computing device, the business email configuration profile including the compliance rule, wherein the compliance rule requires the mobile computing device to be within a threshold distance of a second mobile computing device in order to access a business email account;
causing, by the management server, the mobile computing device to switch from a personal email configuration profile to the business email configuration profile based on the location of the mobile computing device; and
causing the mobile computing device to:
detect a call, by an application of the mobile computing device to an operating system of the mobile computing device, that attempts to access the business email account;
determine a distance between the mobile computing device and the second mobile computing device;
determine whether the distance is within the threshold distance required by the compliance rule;
if the mobile computing device is within the threshold distance of the second mobile computing device, approve the call by the application; and
if the mobile computing device is outside the threshold distance of the second mobile computing device, block the call by the application.

2. The method of claim 1, wherein the detecting, determining, approving, and blocking are carried out by an agent application installed on the mobile computing device by a management server based on the device enrolling with the management server.

3. The method of claim 1, further comprising providing an agent application, from a management server to the mobile computing device, wherein the agent application enforces the compliance rule.

4. The method of claim 1, wherein the business email configuration profile is established be an administrator and applied to a plurality of user devices based on the users of those user devices having a same level of email access privilege.

5. The method of claim 1, wherein the application of the mobile computing device comprises a web browser.

6. The method of claim 1, wherein the compliance rule further specifies that the mobile computing device block the call to the operating system if the mobile computing device is not connected to a virtual private network (VPN).

7. The method of claim 1, further comprising providing the compliance rule from the management server to the second mobile computing device.

8. A non-transitory, computer-readable medium comprising instructions which, when executed by a processor of a management server, causes a mobile computing device to enforce a compliance rule associated with a business email configuration profile by performing stages comprising:
providing the business email configuration profile from the management server to the mobile computing device, the business email configuration profile including the compliance rule, wherein the compliance rule requires the mobile computing device to be within a threshold distance of a second mobile computing device in order to access a business email account;
causing, by the management server, the mobile computing device to switch from a personal email configuration profile to the business email configuration profile based on the location of the mobile computing device; and
causing the mobile computing device to:
detect a call, by an application of the mobile computing device to an operating system of the mobile computing device, that attempts to access the business email account;
determine a distance between the mobile computing device and the second mobile computing device;
determine whether the distance is within the threshold distance required by the compliance rule;
if the mobile computing device is within the threshold distance of the second mobile computing device, approve the call by the application; and if the mobile computing device is outside the threshold distance of the second mobile computing device, block the call by the application.

9. The non-transitory, computer-readable medium of claim 8, wherein the detecting, determining, approving, and blocking are carried out by an agent application installed on the mobile computing device by a management server based on the device enrolling with the management server.

10. The non-transitory, computer-readable medium of claim 8, the stages further comprising providing an agent application, from a management server to the mobile computing device, wherein the agent application enforces the compliance rule.

11. The non-transitory, computer-readable medium of claim 8, wherein the business email configuration profile is established be an administrator and applied to a plurality of user devices based on the users of those user devices having a same level of email access privilege.

12. The non-transitory, computer-readable medium of claim 8, wherein the application of the mobile computing device comprises a web browser.

13. The non-transitory, computer-readable medium of claim 8, wherein the compliance rule further specifies that the mobile computing device block the call to the operating system if the mobile computing device is not connected to a virtual private network (VPN).

14. The non-transitory, computer-readable medium of claim 8, the stages further comprising providing the compliance rule from the management server to the second mobile computing device.

15. A management system for enforcing a compliance rule associated with a business email configuration profile, comprising:
a management server comprising a processor and a memory store, the memory store comprising non-transitory, computer-readable, instructions that, when executed by
the processor, cause the processor to perform stages comprising:
providing the business email configuration profile from the management server to a mobile computing device, the business email configuration profile including the compliance rule, wherein the compliance rule requires the mobile computing device to be within a threshold distance of a second mobile computing device in order to access a business email account;
causing, by the management server, the mobile computing device to switch from a personal email configuration profile to the business email configuration profile based on the location of the mobile computing device; and
causing the mobile computing device to:
detect a call, by an application of the mobile computing device to an operating system of the mobile computing device, that attempts to access the business email account;
determine a distance between the mobile computing device and the second mobile computing device;
determine whether the distance is within the threshold distance required by the compliance rule;
if the mobile computing device is within the threshold distance of the second mobile computing device, approve the call by the application; and
if the mobile computing device is outside the threshold distance of the second mobile computing device, block the call by the application.

16. The management system of claim 15, wherein the detecting, determining, approving, and blocking are carried out by an agent application installed on the mobile computing device by a management server based on the device enrolling with the management server.

17. The management system of claim 15, the stages further comprising providing an agent application, from a management server to the mobile computing device, wherein the agent application enforces the compliance rule.

18. The management system of claim 15, wherein the business email configuration profile is established be an administrator and applied to a plurality of user devices based on the users of those user devices having a same level of email access privilege.

19. The management system of claim 15, wherein the application of the mobile computing device comprises a web browser.

20. The management system of claim 15, wherein the compliance rule further specifies that the mobile computing device block the call to the operating system if the mobile computing device is not connected to a virtual private network (VPN).

* * * * *